United States Patent
Maier et al.

(10) Patent No.: US 7,441,304 B2
(45) Date of Patent: Oct. 28, 2008

(54) VACUUM ARRANGEMENT FOR A GROUND AREA

(75) Inventors: Georg Maier, Kernen i. R. (DE); Harald Mang, Winnenden (DE); Klaus Langhans, Winnenden (DE); Wolfgang Layher, Waiblingen (DE); Uwe Gaese, Stuttgart (DE); Jorg Schutt, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 493 days.

(21) Appl. No.: 10/908,412

(22) Filed: May 11, 2005

(65) Prior Publication Data

US 2005/0257510 A1  Nov. 24, 2005

(30) Foreign Application Priority Data

May 22, 2004  (DE) ........................ 10 2004 025 197

(51) Int. Cl.
*A47L 5/14* (2006.01)
(52) U.S. Cl. .............................. 15/345; 15/320; 15/321
(58) Field of Classification Search .................... 15/345, 15/414, 320, 344, 339, 321
See application file for complete search history.

(56) References Cited

U.S. PATENT DOCUMENTS

| 3,460,327 | A | | 8/1969 | Johnson et al. | |
|---|---|---|---|---|---|
| 3,663,984 | A | * | 5/1972 | Anthony et al. | 15/321 |
| 3,774,262 | A | * | 11/1973 | Anthony et al. | 15/322 |
| 4,127,913 | A | * | 12/1978 | Monson | 15/321 |
| 4,499,713 | A | | 2/1985 | Stone | |
| 5,499,493 | A | | 3/1996 | Rosset | |
| 6,279,196 | B2 | * | 8/2001 | Kasen et al. | 15/320 |
| 6,286,181 | B1 | * | 9/2001 | Kasper et al. | 15/320 |
| 2002/0162187 | A1 | * | 11/2002 | Keller | 15/345 |
| 2005/0257510 | A1 | * | 11/2005 | Maier et al. | 56/16.4 R |

FOREIGN PATENT DOCUMENTS

WO  WO 2004/014120 A1  2/2004

* cited by examiner

*Primary Examiner*—Lee D Wilson
(74) *Attorney, Agent, or Firm*—Gudrun E. Huckett

(57) ABSTRACT

A vacuum arrangement has a vacuum pipe having a vacuum opening facing a ground surface and adapted to pick up from the ground surface a material to be collected. The vacuum pipe conveys the material to be collected into a collecting container connected to the vacuum pipe. The vacuum pipe has a working area located within the area of the vacuum opening. At least one blower nozzle having a blower air exit is arranged such that a blower air flow exiting from the blower air exit is directed onto the ground surface into the working area. The blower air exit and the vacuum opening are positioned at a spacing relative to one another.

29 Claims, 8 Drawing Sheets

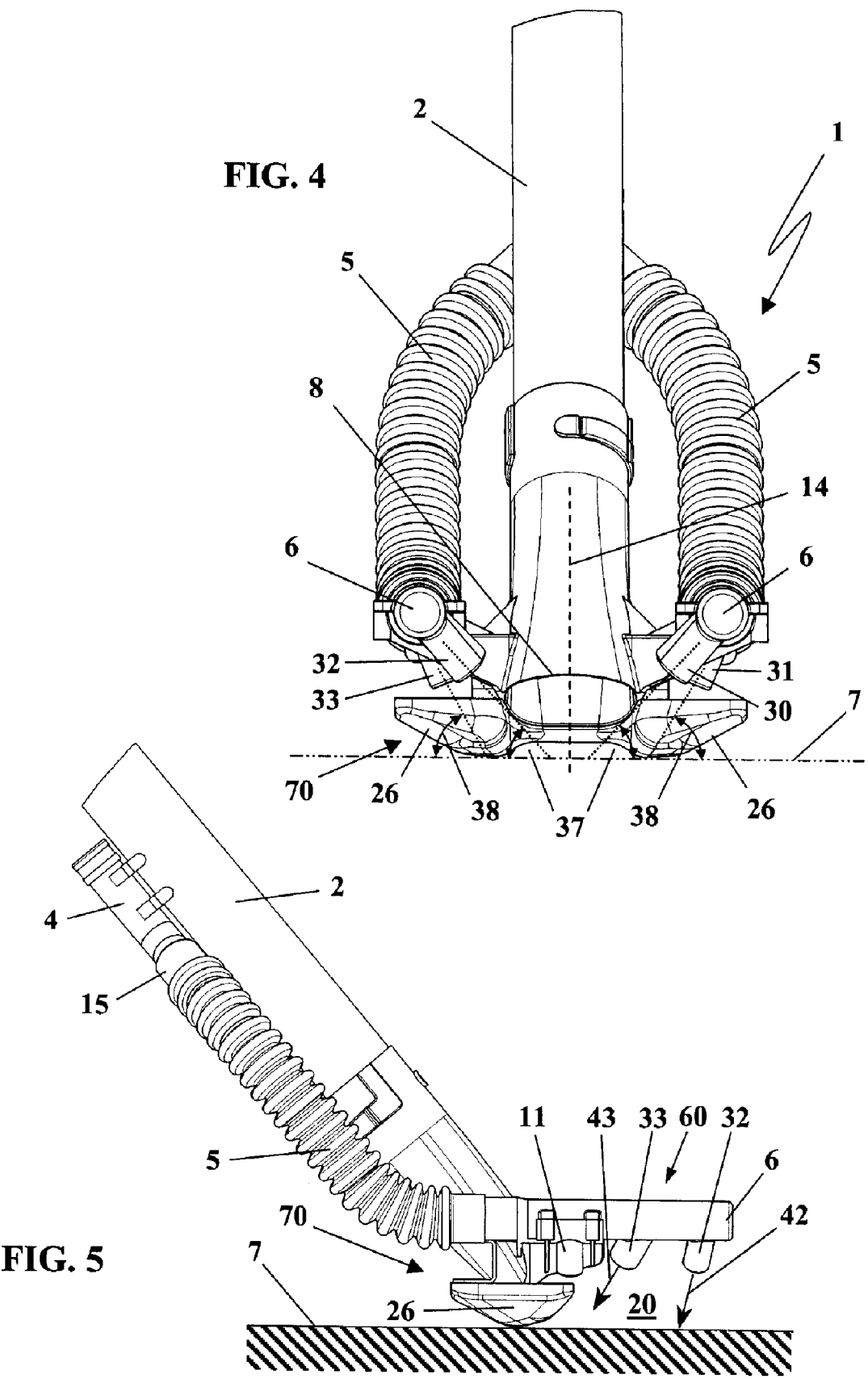

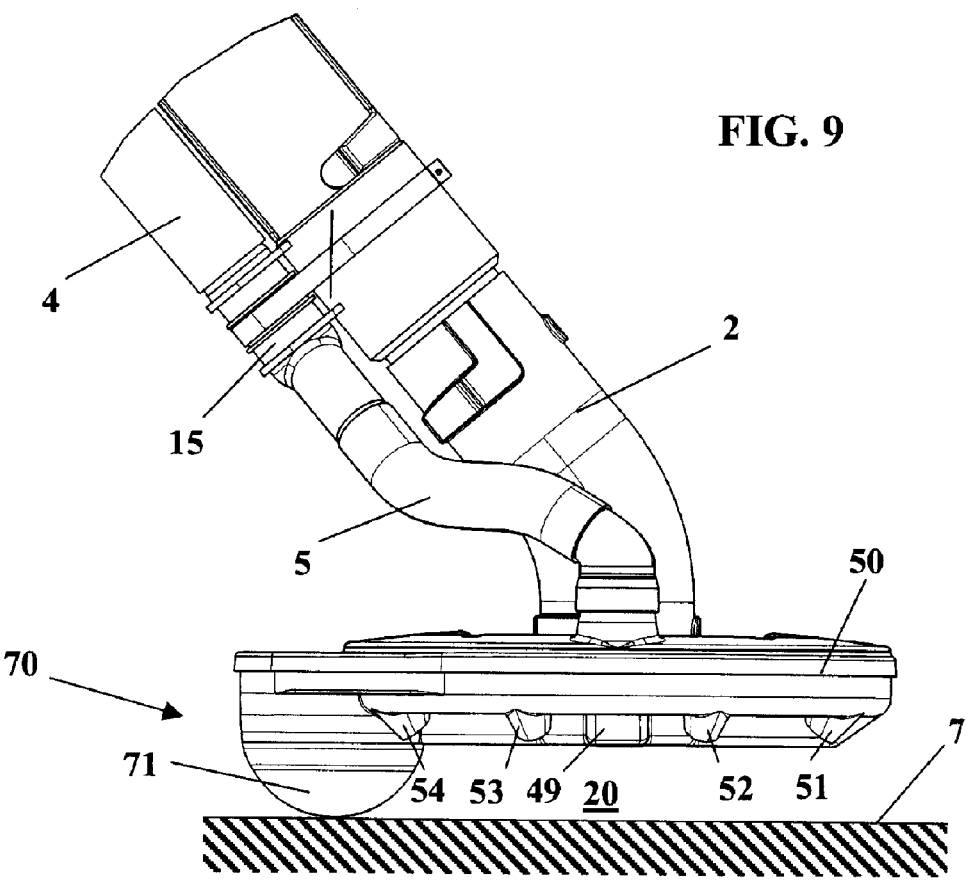
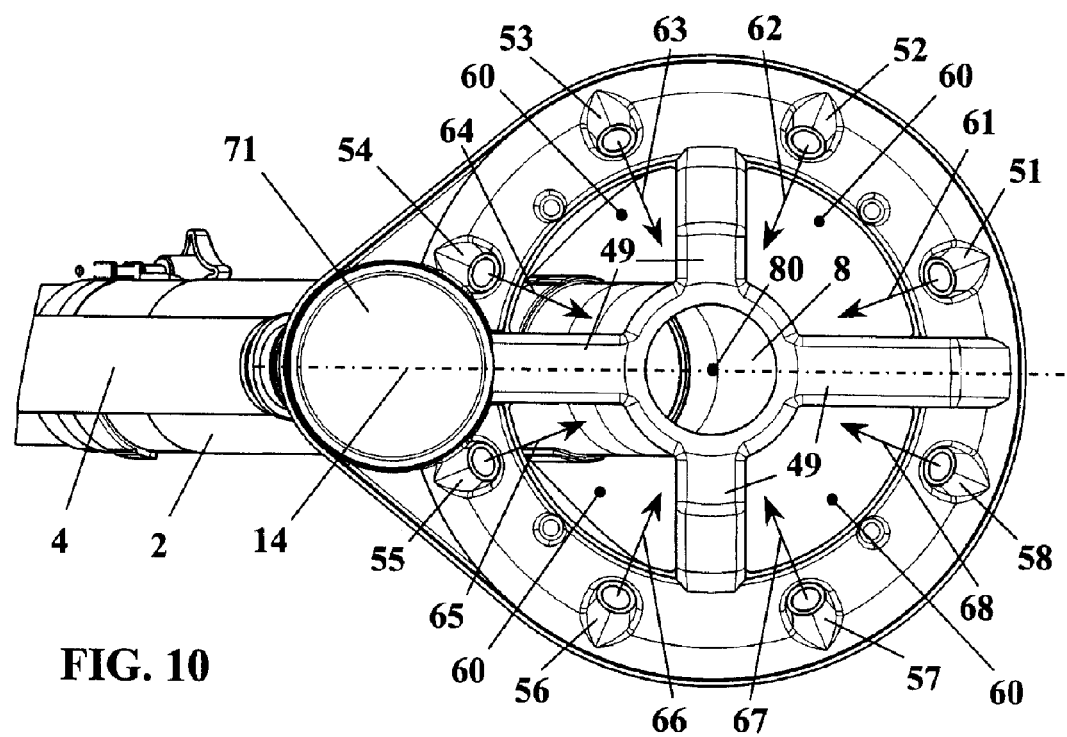

VACUUM ARRANGEMENT FOR A GROUND AREA

BACKGROUND OF THE INVENTION

The invention relates to a vacuum arrangement, in particular for gathering material from a ground area, for example, for gathering a harvest such as small fruits, such as chestnuts, nuts, berries, olives, coffee cherries or the like. The vacuum arrangement comprises a vacuum pipe for picking up the material to be collected and conveying it into a collecting container, wherein the vacuum opening of the vacuum pipe faces the ground. The vacuum arrangement has a working area in the area of the vacuum opening.

For harvesting small fruits such as olives, it is customary to shake or beat the fruits from the trees and to collect the fruits from the ground. For this purpose, vacuum devices are known that pick up the material lying on the ground like a vacuum cleaner. A disadvantage is that not only the material to be harvested is collected in the collecting container but also leaves, moss, grass and other foreign matter so that it is necessary to empty the container frequently. When doing so, the harvested material must be separated from the unwanted foreign matter, usually by hand.

Also, vacuum devices are known in which the harvest is guided together with leaves, grass or similar foreign matter in such a way into a collecting container that the foreign matter that is usually lighter is blown out of the vacuum device and only the harvest is retained. However, such devices are very complex and heavy; this is tiring for the operator carrying the device.

SUMMARY OF THE INVENTION

It is an object of the present invention to further develop a vacuum arrangement of the aforementioned kind such that the material to be collected can be taken up in a targeted fashion.

In accordance with the present invention, this is achieved in that at least one blower nozzle is provided, in that the blower air flow exiting from a blower air exit of the blower nozzle is oriented toward the ground and directed into the working area, and that the blower air exit of the blower nozzle and the vacuum opening of the vacuum pipe are positioned at a spacing relative to one another.

The blower air flow that exits from the blower nozzle is positioned at a spacing from the vacuum opening and is directed toward the ground in the area of the vacuum opening so that the material to be picked up is conveyed by the blower air flow in the direction toward the vacuum opening; in this way, the harvest is easily picked up through the vacuum opening. In particular, the blower air flow can pneumatically lift the material to be collected out of tall grass or ground depressions; in this way, it becomes actually possible to pick up the material to be collected by means of a vacuum device. In the collecting container essentially only the material to be collected will gather so that the degree of filling with material to be collected is significantly increased in comparison to conventional vacuuming methods and the efficiency of the vacuum pick-up action is improved.

When at least a partial area of the working area arranged between the blower air exit and the vacuum opening is visible from above, the operator is able to guide the vacuum arrangement in a simple, targeted way. When the partial area is open upwardly, it is moreover possible to blow away lightweight foreign matter from heavy material to be collected, preferably a harvest such as small fruits, for example, chestnuts, nuts, berries, olives, coffee cherries or the like, so that essentially only the harvest is taken up through the vacuum opening. The degree of filling of the collecting container with the harvest is improved so that, when emptying the collecting container, a manual separation of the harvest from foreign matter is usually no longer required.

It can be advantageous to configure the open partial area so as to be closable entirely or partially by means of a closure element, such as a slide or the like, so that picking up the material to be collected rather than the foreign matter, which is enabled by means of the blower air flow on the ground area, can be controlled. When the closure element is transparent, viewing of the ground is still possible through the closed partial area; this facilitates guiding of the vacuum arrangement. For completely closed partial areas, the vacuum arrangement can be used as a vacuum cleaner for ground areas.

Preferably, the blower air flow of the blower nozzle is oriented at least partially in the direction toward the vacuum opening so that the blower air flow not only blows away leaves, grass, moss, and the like, but conveys at the same time the harvest in the direction toward the vacuum opening of the vacuum pipe. When a blower nozzle is positioned immediately opposite the vacuum opening, the conveying action for small fruits picked up through the vacuum opening can be improved.

The entry surface area of the vacuum opening and the ground surface are positioned at an angle of less than 70 degrees relative to one another, preferably at an angle of approximately 45 degrees; this provides effective working with a high pickup efficiency.

Preferably, several blower nozzles are arranged such that, relative to the working area, two blower nozzles are positioned approximately opposed to one another and the blower nozzles forming a pair have the same orientation, respectively; preferably, they are positioned at the same angle relative to the ground surface. In this way, it is achieved that the reaction force caused by the blower air flow of the first nozzle impacting on the ground surface is compensated by the blower air flow of the second nozzle. The vacuum arrangement according to the invention can be handled easily. When the blower air flows of a pair of blower nozzles cross one another preferably approximately at a center plane of the working area of the vacuum arrangement or near the center of the vacuum opening, the blower air flows that meet will receive a directional component in the upward direction, in particular vertically upwardly, so that lightweight parts are whirled up.

It can be expedient to arrange the blower air nozzles at different angles relative to the ground surface in order to enable a penetration of the blower air to different levels, for example, within grass.

In an advantageous configuration, several blower nozzles are arranged on a circle having the vacuum opening as a center, wherein all blower nozzles of the circle are positioned expediently at the same angle relative to the ground surface. All nozzles convey in a direction toward the center of the circle where the vacuum opening of the vacuum pipe is arranged. Through open windows within the circle, the lightweight material flies away; only the heavy small fruits remain below the vacuum opening and are picked up by the suction air flow.

In order to provide the operator with a force-saving guiding action of the vacuum arrangement according to the invention, the vacuum pipe and the blower nozzles are secured on a common support member and the support member has a spacer that can be placed onto the ground surface. The spacer can be a flap, a glide member, in particular a glide shoe, but also a roller wherein the axis of rotation of the roller extends parallel to the ground surface and preferably approximately parallel to the vacuum pipe. In this connection, the roller is axially crowned, so that not only in the direction of rotation a simple movement is possible but also in the direction of the axis of rotation itself; in this direction, the roller then operates as a runner or skid.

According to a further embodiment of the invention, the angle between the vacuum pipe and the arrangement comprising the blower nozzle is adjustable so that the longitudinal axis of the vacuum arrangement extends parallel to the ground surface even when the angle of the vacuum pipe is changed. Independent of the height of an operator carrying the vacuum arrangement by means of the vacuum pipe, parallel arrangement of the vacuum arrangement relative to the ground surface is ensured.

BRIEF DESCRIPTION OF THE DRAWING

Further features of the invention result from the additional claims, the description, and the drawings illustrating embodiments that will be explained in detail in the following.

FIG. 4 is a view of the vacuum arrangement according to FIG. 1 with a glide shoe as a spacer.

FIG. 5 is a side view of the vacuum arrangement according to FIG. 4.

FIG. 9 is a side view of the annular nozzle according to FIG. 8.

FIG. 10 is a bottom view of the annular nozzle according to FIG. 8.

DESCRIPTION OF THE PREFERRED EMBODIMENTS

Figure 1:
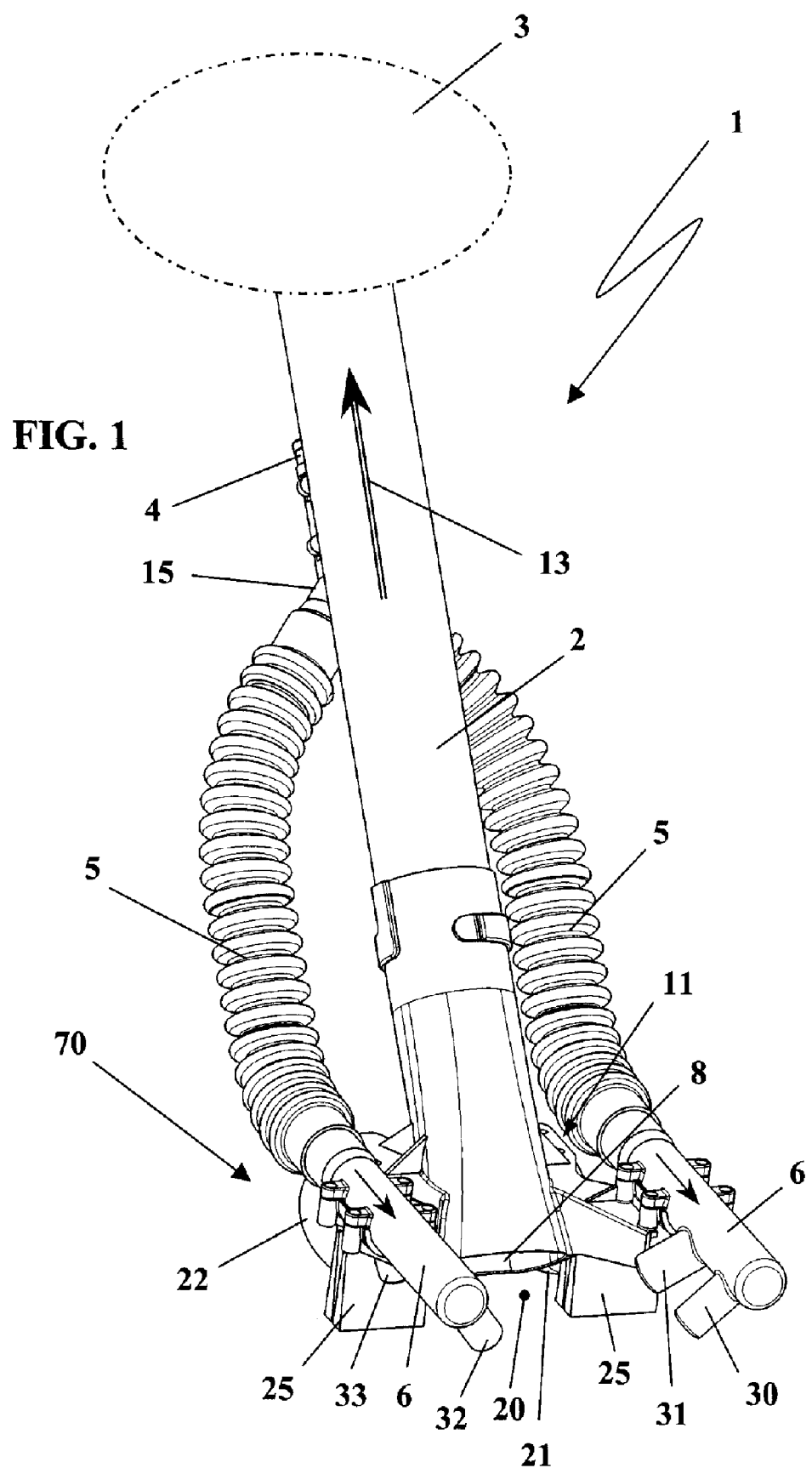
FIG. 1 shows a perspective view of a vacuum arrangement in the form of a bifurcated nozzle.

The vacuum arrangement 1 illustrated in FIG. 1 serves for gathering material to be collected, such as loose parts, from a ground surface 7. The vacuum arrangement 1 is preferably configured for vacuuming material to be collected, such as a harvest, in particular, small fruits, for example, chestnuts, nuts, berries, olives, coffee cherries and the like, from the ground. The vacuum arrangement 1 according to the invention can also be used for effectively cleaning ground areas.

The vacuum arrangement 1 is comprised essentially of a vacuum pipe 2 through which the sucked-in material to be collected is conveyed to a collecting container 3 that is illustrated schematically in FIG. 1.

Figure 2:
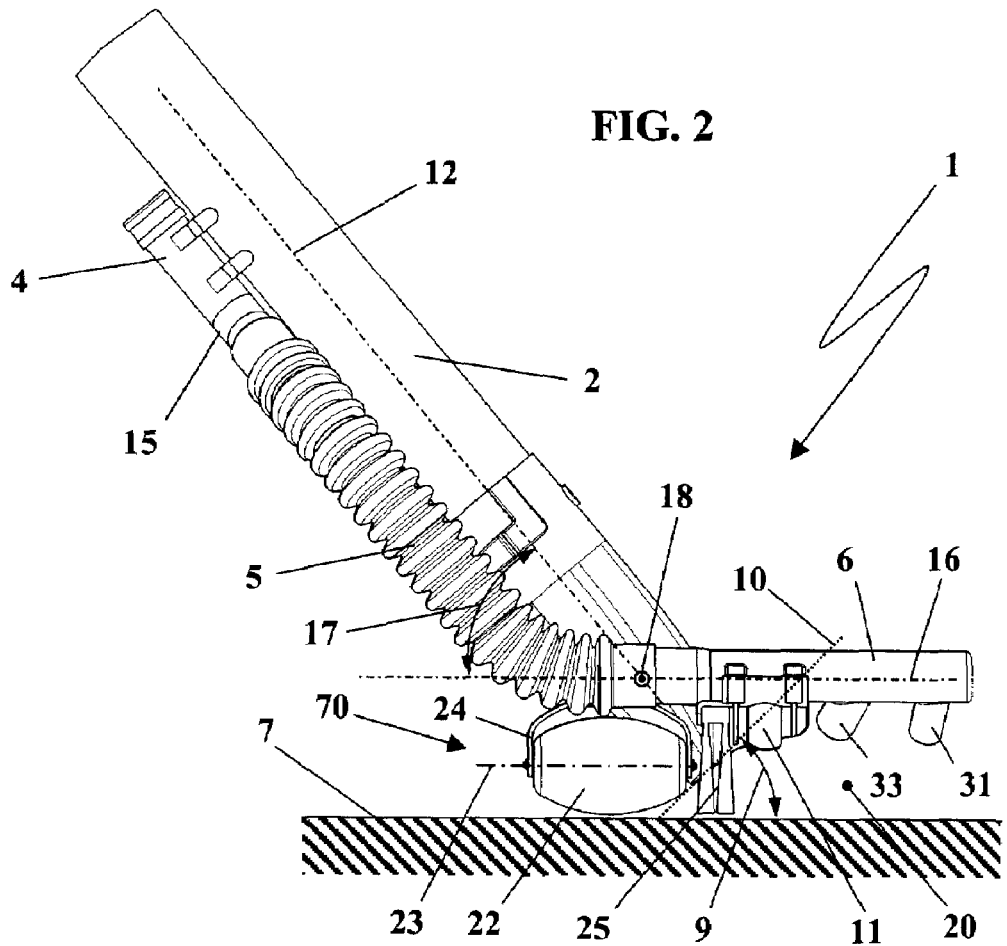
FIG. 2 is a side view of the vacuum arrangement according to FIG. 1.

As illustrated in FIG. 2, a blower pipe 4 is attached to the vacuum pipe 2 and branches by means of a T-shaped socket 15 into two air channels 5 or air hoses each opening into an end pipe having a closed end. In the primary operating position of the vacuum arrangement 1, the longitudinal axes 16 of the end pipes 6 are positioned, as shown in FIG. 2, approximately parallel to the ground surface 7 from which the material is to be collected. The position of the longitudinal axes 16 corresponds thus also to the position of the vacuum arrangement 1 relative to the ground surface 7.

The vacuum pipe 2 has a front vacuum opening 8 that, in the illustrated embodiment, is positioned at an angle 9 of approximately 45 degrees to the ground surface 7. Expediently, the entry plane 10 of the entry surface area of the vacuum opening 8 is positioned at an angle of less than approximately 70 degrees, preferably approximately 45 degrees, relative to the ground surface 7. The end pipes 6 extend to the right and to the left adjacent to the vacuum pipe 2 and project past the vacuum opening 8 of the vacuum pipe 2 (FIG. 3).

The vacuum pipe 2 and the end pipes 6 with the air channels 5 are supported together on a common support member 11. The longitudinal axes 16 of the end pipes 6 and the longitudinal axis 12 of the vacuum pipe 2 are positioned approximately parallel to one another in a plan view according to FIG. 3, wherein the longitudinal axis 12 of the vacuum pipe 2 is positioned at an angle 17 of approximately 45 degrees (FIG. 2) relative to a plane of the vacuum arrangement 1 defined by the longitudinal axes 16. Preferably, the vacuum pipe 2 is pivotable relative to the support member 11 about an axis of rotation 18 that extends transversely to the longitudinal axes 12 and 16 and approximately parallel to the ground surface 7 so that the vacuum arrangement 1 itself extends with its longitudinal axes 16 approximately parallel to the ground surface 7, even for a change of the angle of the vacuum pipe 2 relative to the ground surface 7. Independent of the height of an operator carrying the vacuum arrangement 1 by means of the vacuum pipe 2, a parallel arrangement of the vacuum arrangement 1 relative to the ground surface 7 is ensured.

Between the end pipes 6 projecting past the vacuum opening 8 and the vacuum opening 8 itself, a working area 20 of the vacuum arrangement 1 is defined. The working area 20 is positioned below the plane defined by the longitudinal axes 16 and extending approximately parallel to the ground surface 7. As shown in FIG. 3, from this working area 20 the suction air flows in the direction of arrow 13 into the vacuum pipe 2 and the collecting container 3 (FIG. 1). Simultaneously, blower air is blown into the working area 20. For this purpose, the end pipes 6 have blower nozzles 30, 31, 32, 33 that are oriented such that their respective blower air flows 40, 41, 42, and 43 are directed onto the surface area of the working area 20 positioned in the area in front of the vacuum opening 8. The blower air flows 40 to 43 exiting from the blower nozzles 30 to 33 are advantageously at least partially oriented in the direction toward the vacuum opening 8. When the working area 20 is divided by an imaginary vertical center plane 14 into two symmetrical halves, the vacuum opening 8 is positioned preferably symmetrically to the center plane 14. Also, the end pipes 6 with the blower nozzles 30 to 33 are arranged such that, in a plan view according to FIG. 3, they are positioned symmetrically to the center plane 14 of the working area 20. Relative to the center plane 14 each blower nozzle 30, 31 has positioned directly opposed thereto a blower nozzle 32, 33. It can be advantageous in this connection to align the blower nozzles in pairs, respectively, so that relative to the center plane 14 the oppositely positioned blower nozzles 30, 32; 31, 33 are aligned at the same angle relative to the surface 7 and to the vacuum opening 8. With regard to its volume, the blower air is approximately symmetrically divided relative to the center plane 14. In this way, a directional component is imparted in the upward direction, preferably in a direction vertically upwardly, on the air flows 40 and 42 and/or 41 and 43 that meet below a plane that is defined by the longitudinal axes 16. Lightweight parts are thus whirled up. Moreover, the occurring reaction forces can be compensated relative to the center plane 14 so that an easy guiding action is provided for the vacuum arrangement 1. Particularly the intersecting area of two blower air flows is preferably positioned on the center plane 14 so that the vertical directional component does not cause any tilting movement about the axis 12 of the vacuum pipe 2. Instead, the directional component that is directed vertically upwardly can counteract the weight of the vacuum pipe arrangement so that handling is made easier.

Figure 3:
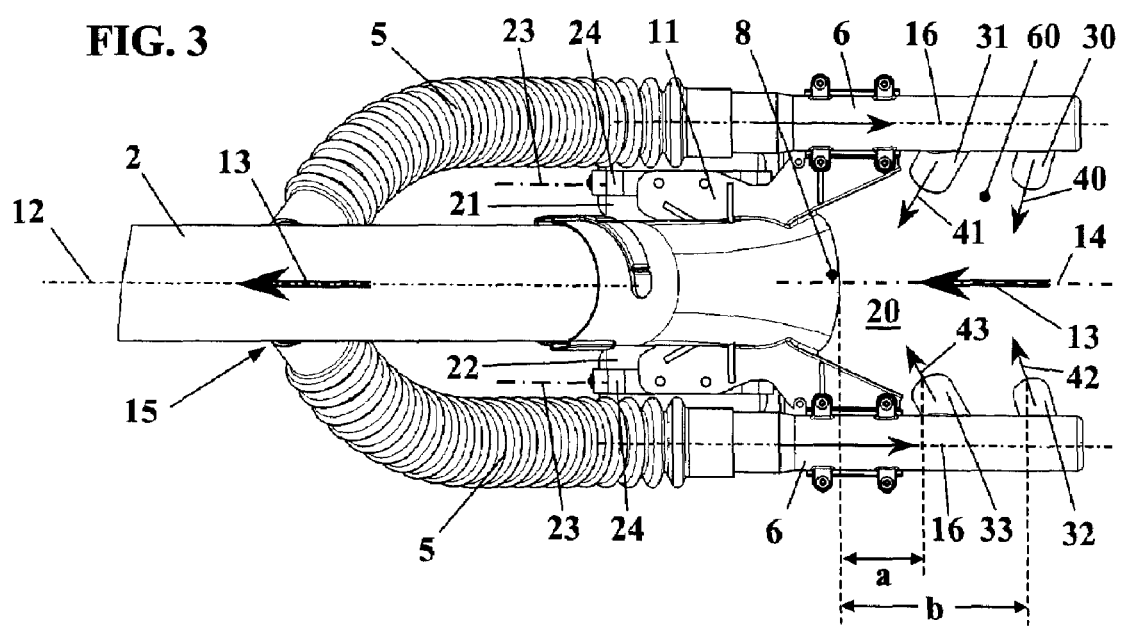
FIG. 3 is a plan view onto the vacuum arrangement according to FIG. 1.

As can be taken from FIGS. 1 through 3, relative to the longitudinal extension of the vacuum pipe 2, the blower air exits of the blower nozzles 30 to 33 are spaced from the vacuum opening 8 at a spacing a or b, measured horizontally relative to the ground surface 7. In this way, the blower nozzles 31, 33 near the vacuum opening 8 have a spacing a relative to the vacuum opening 8 while the remotely positioned blower nozzles 30 and 32 have a greater spacing b relative to the vacuum opening 8. In this embodiment, the working area 20 is open in the upward direction, i.e., a window 60 that is delimited by the vacuum pipe 2 or the vacuum opening 8 and the end pipes 6 is open. The blower air supplied through the blower nozzles 30 to 33 is removed partially by vacuum through the vacuum opening 8 and flows partially upwardly through the window 60 and to the front. By means of the open construction, it is achieved that leaves, grass or other obstacles that may cover the material to be harvested are blown off. The material to be collected can be safely entrained and picked up by the vacuum air flow of the vacuum pipe 2. The blower air nozzles 30 to 34 have moreover the advantage that they can lift the material to be collected out of tall grass or out of depressions in the ground onto an air cushion so that removal of the harvest is possible even under unfavorable conditions. Because essentially only the material to be collected is picked up by vacuum, the collecting container 3 contains primarily the material to be collected and only minimal proportions of foreign matter. This has the advantage that the volume of the collecting container for receiving the material to be collected is used more effectively.

In order to provide the operator with a simplified guiding action for the vacuum arrangement 1, a spacer 70 can be attached to the common support member 11 and can be placed onto the ground surface 7. The spacer 70 is positioned outside of the working area 20 below the vacuum pipe 2 near the vacuum opening 8. In the illustrated embodiment according to FIGS. 1 to 3, rollers 21 and 22 are provided as spacers; they are rotatably supported on axes of rotation 23 that are parallel to the ground surface 7. As shown in particular in a plan view according to FIG. 3, the axes of rotation 23 are positioned in this connection parallel to the longitudinal axes of the end pipes 6 or the longitudinal axis 12 of the vacuum pipe 2. As illustrated, a roller 21, 22 is secured by a bracket 24 that, in turn, is secured on the support member 11 on either side of the center plane 14. In order to be able to carry out not only an easy lateral reciprocating movement but also a forward movement with minimal force expenditure, the rollers 22 are of a crowned configuration in the axial direction so that the rollers 21, 22 serve as a gliding means or runner in the direction of the axis of rotation 23.

In order to keep the dirt load of the rotating rollers 21 and 22 at a minimum, between the rollers 21 and 22 and the working area 20 a flexible blocking means 25 in the form of brushes, flexible flaps or the like is provided. These flaps 25 made of a flexible material can in themselves be the spacers 70 and can be provided as the only measure for ensuring proper spacing.

In the embodiment according to FIGS. 4 and 5, a vacuum arrangement is illustrated that is identical to that of FIGS. 1 through 3 in regard to its configuration. Runners or skids are provided in place of the rollers in the configuration of FIGS. 4 and 5; as shown in the front view of FIG. 4, they are arranged on either side of the vacuum opening 8 below the vacuum pipe 2 outside of the window 60. The runners 26 are configured such that the vacuum arrangement 1 can be moved laterally as well as easily forwardly and backwardly and glide on the ground surface 7. The shape is configured such that the runners are crowned or rounded in the transverse as well as longitudinal direction relative to the vacuum pipe 2.

As can be seen in the front view according to FIG. 4, the nozzles 30 and 32 that are positioned remote from the vacuum opening 8 are positioned at a smaller angle 37 relative to the ground surface 7 than the nozzles 31 and 33 positioned near the vacuum opening 8 at an angle 38 relative to the ground surface 7. FIG. 4 also shows that the nozzles 30, 32; 31, 33 positioned in pairs opposite one another relative to the center plane 14 are arranged spatially at the same angle 37 and 38 so that reaction forces result that compensate one another relative to the center plane 14. A directional component in the upward direction is imparted on the blower air flows that meet at the center plane.

Figure 6:
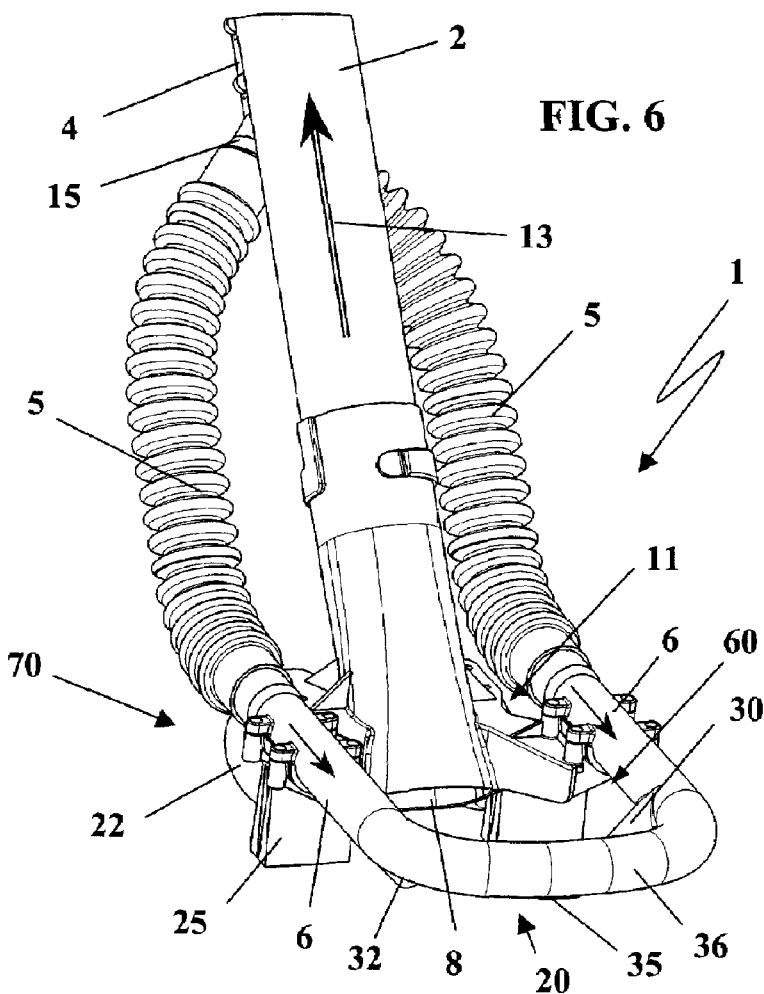
FIG. 6 is a perspective view of a closed bifurcated nozzle in a configuration corresponding to that of the open bifurcated nozzle of FIG. 1.
Figure 7:
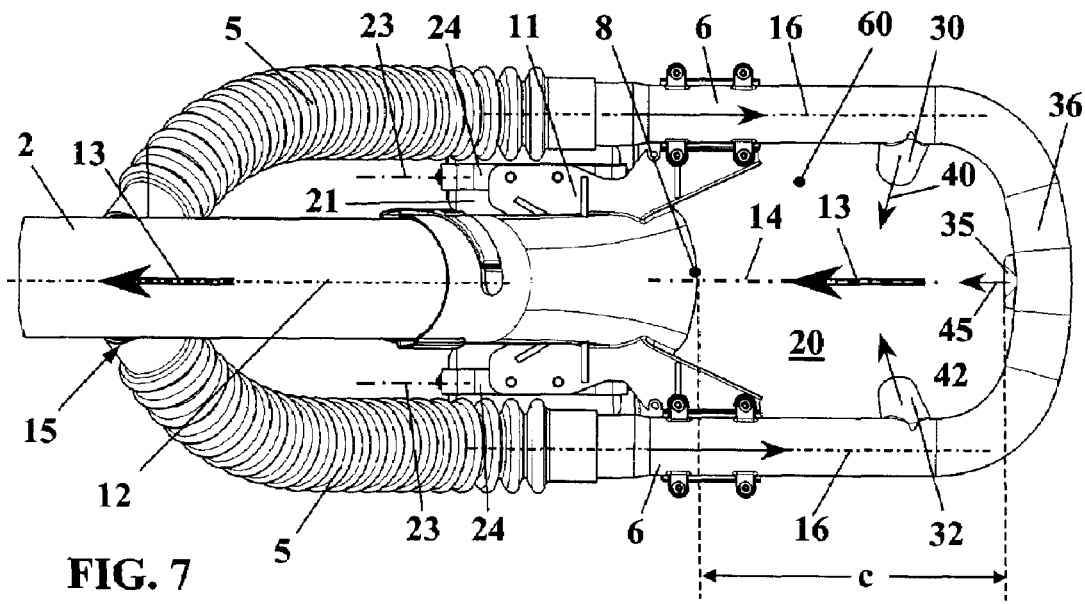
FIG. 7 is a plan view of the closed bifurcated nozzle according to FIG. 6.
Figure 8:
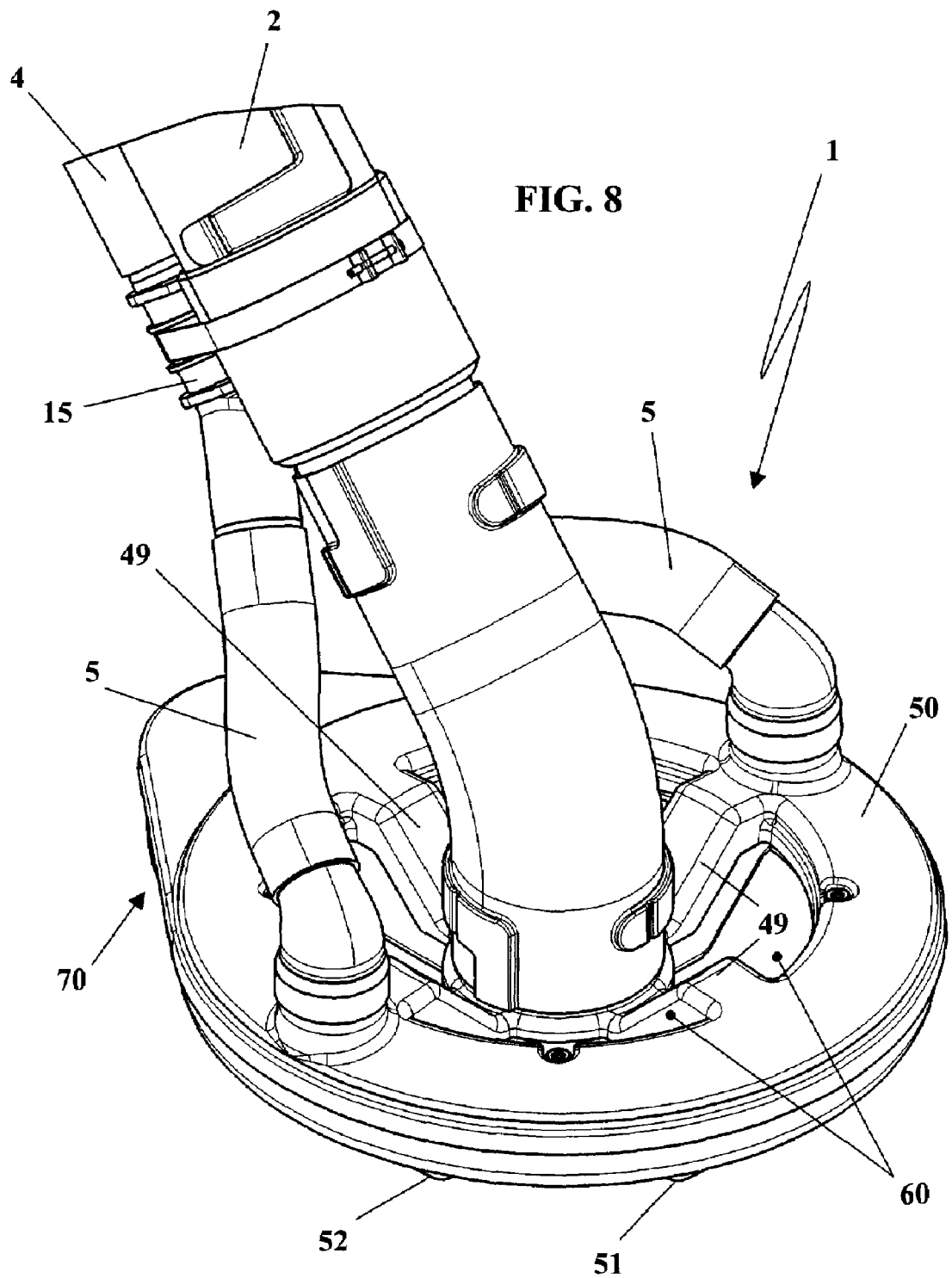
FIG. 8 is a perspective view of an annular nozzle.
Figure 11:
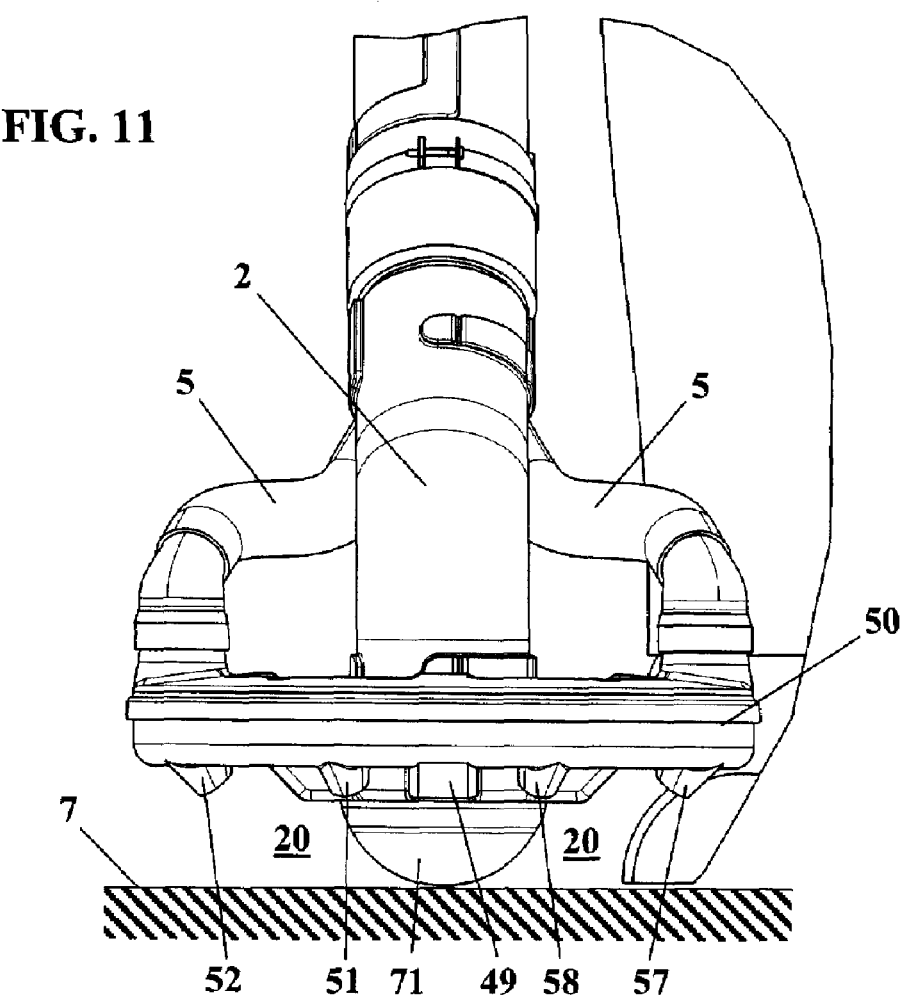
FIG. 11 is a front view of the annular nozzle according to FIG. 8.

The embodiment of FIGS. 6 and 7 corresponds in its basic configuration to the embodiments of FIG. 1 to 5 so that same reference numerals are used for same parts.

In deviation from the embodiments of FIG. 1 through 5, the end pipes 6 have open ends connected to one another by means of a connecting pipe 36 for guiding the air flow. Centrally relative to the center plane 14, a blower nozzle 35 is arranged on the connecting pipe 36 that is positioned immediately opposite the vacuum opening 8 at a spacing c that is measured horizontally relative to the ground surface 7 (FIG. 7). The exiting blower air flow 45 is directed at a slant downwardly onto the ground in the working area 20 wherein the blower air flow 45 has a flow component that is oriented directly onto the vacuum opening 8.

The blower nozzles 31 and 33 of the end pipes 6 near the vacuum opening 8 of the embodiments of FIGS. 1 through 5 are eliminated. However, it can be expedient also in the case of the closed bifurcated nozzle to arrange blower nozzles near the vacuum opening 8 in accordance with the embodiment of FIGS. 6 and 7.

Even though in the embodiment of FIGS. 6 and 7 rollers 21, 22 are shown as spacers 70 to the ground surface 7, it is possible, as shown in the embodiment according to FIG. 4 and FIG. 5, to provide skids, runners, flaps or the like as spacers.

In a third embodiment of the invention, a vacuum arrangement 1 embodied as an annular nozzle is provided, as illustrated in FIGS. 8 through 12. The annular nozzle is comprised of a ring 50, preferably a blower air guiding ring, having at its center the vacuum opening 8 of the vacuum pipe 2. The vacuum opening 8 is secured by radial stays 49; open windows 60 are delimited between the radial stays 49, the ring 50, and the blower pipe 2. According to the invention, the working area 20 positioned below the ring 50 is open in the upward direction so that leaves, loose grass, moss, or dirt can fly away.

On the side of the ring 50 facing the ground surface 7, blower nozzles 51 to 58 (FIG. 10) are provided whose blower air flow 61 to 68 is oriented at a slant downwardly in the direction toward the center of the ring 50 onto the bottom surface 7, respectively. In this configuration, it is also provided that the reaction forces of the blower air flows 61 to 68 oriented toward the ground surface 7 will cancel one another. Accordingly, the blower nozzles that are diametrically opposed to one another are of the same configuration and of the same orientation so that, relative to the center 80 of the annular nozzle, the reaction forces are substantially canceled. The blower air flows that meet one another are deflected in the upward direction.

In the embodiment according to FIGS. 8 through 12, the blower air is supplied through a blower pipe 4 that is branched by means of a T-shaped member 15 into two air hoses 5 opening on both sides of the center plane 14 into the air-guiding ring 50. It can be expedient to configure the air hoses 5 within the wall of the vacuum channel 2 and to realize the air supply to the ring 50 through the radial stays 49.

On the ring 50, a spacer 70 in the form of a spherical cap 71 is provided that acts as a skid or runner in all movement directions of the annular nozzle 50. The spherical cap 71 is arranged approximately below the vacuum pipe 2 on the ring 50 and supports the weight of the vacuum arrangement 1.

The annular nozzle 50 has the advantage that the air nozzles 51 through 58 can be oriented in a targeted fashion onto a working area 20 below the vacuum opening 8. The material to be picked up, such as nuts or the like, is lifted by the blower air flows 61 to 68, for example, out of tall grass to the vacuum opening 8 so that a safe pickup action is ensured. As a result of the open structure of the annular nozzle 50 with open windows 60 between the stays 49, material that is lighter, such as leaves, grass, moss or the like, will fly through the windows positioned between the stays 49 so that the collecting container will be filled with the material to be collected at an excellent filling factor. When the air flows 61 to 68 cross below the center 80 of the vacuum opening 8, an excellent pickup action of the material to be collected is achieved. Even objects that are retained in depressions within the ground or in grass are released and conveyed to the vacuum opening 8.

Figure 12:
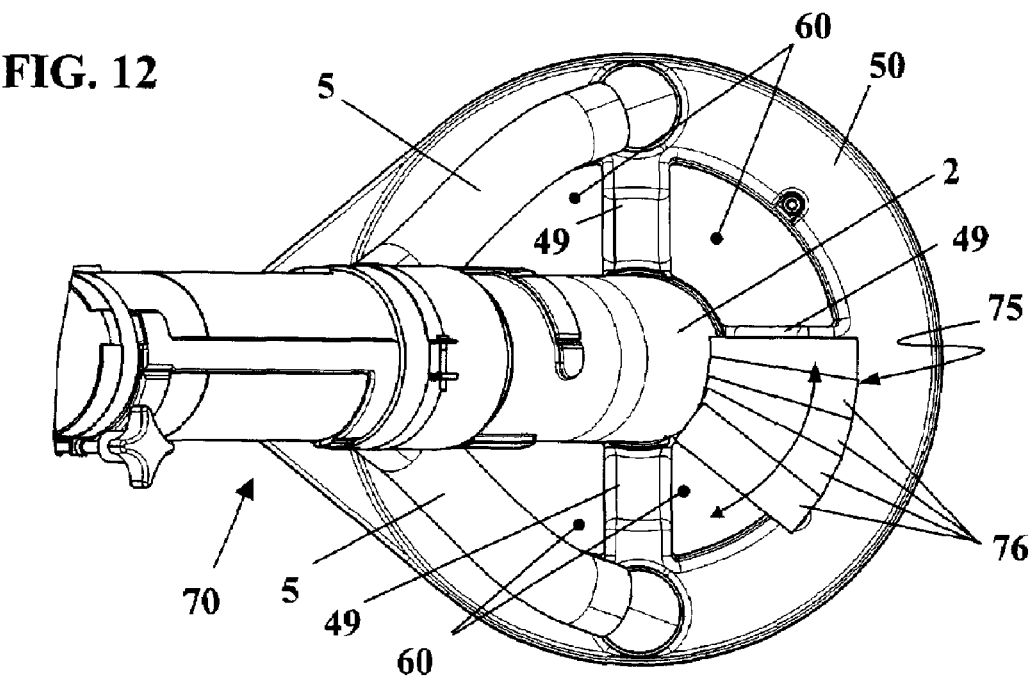
FIG. 12 is a plan view onto the annular nozzle according to FIG. 8.

Advantageously, the window 60 that is delimited by the radial stays 49 and the ring 50 is closable by a closure element 75 entirely or partially (FIG. 12). For this purpose, a slide can be provided that is comprised of several individual parts or leaves 76 that cover the window 60 like a fan. When the fan is completely spread, the window 60 is completely closed. When all windows are closed in this way, the plane of the vacuum arrangement above the vacuum opening 8 is completely closed so that the lightweight material that is whirled up by the blower air flows 60 to 68 is also sucked in through the vacuum opening. The vacuum arrangement is a vacuum cleaning device. In this connection, the supplied blower air can be essentially completely sucked in so that a substantially closed air circulation is provided. When the closure element is configured entirely or partially of a transparent material, the surface area to be vacuumed is visible to the operator so that the operator can monitor the surface to be vacuumed and the material to be removed. Guiding of the vacuum arrangement is thus more efficient.

Figure 13:
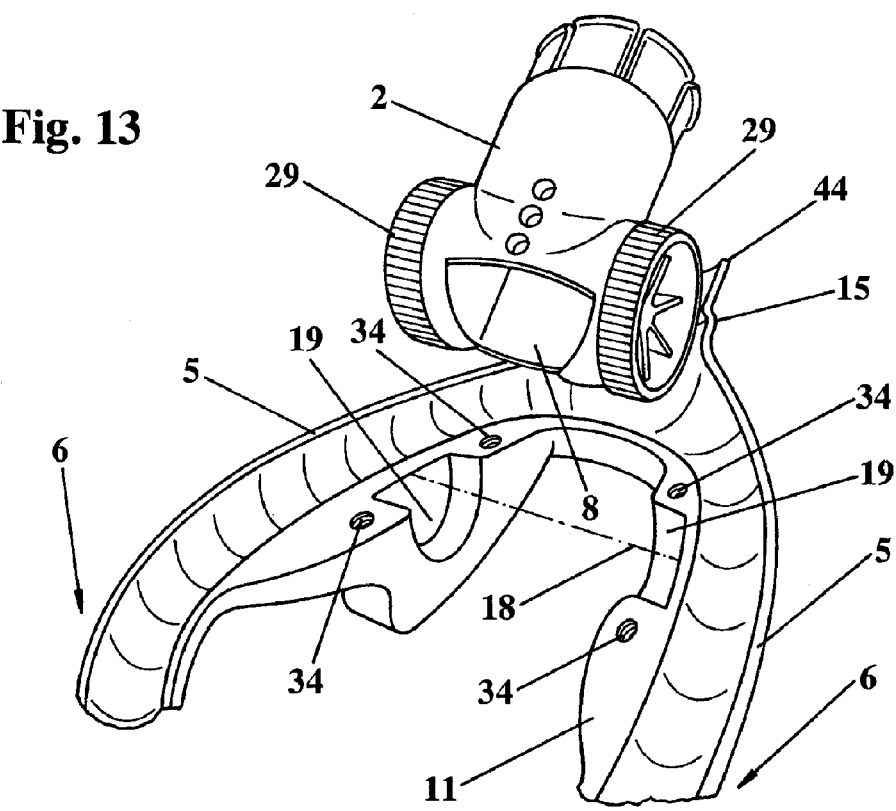
FIG. 13 is a perspective exploded illustration of the connection between the vacuum pipe and the support device.
Figure 14:
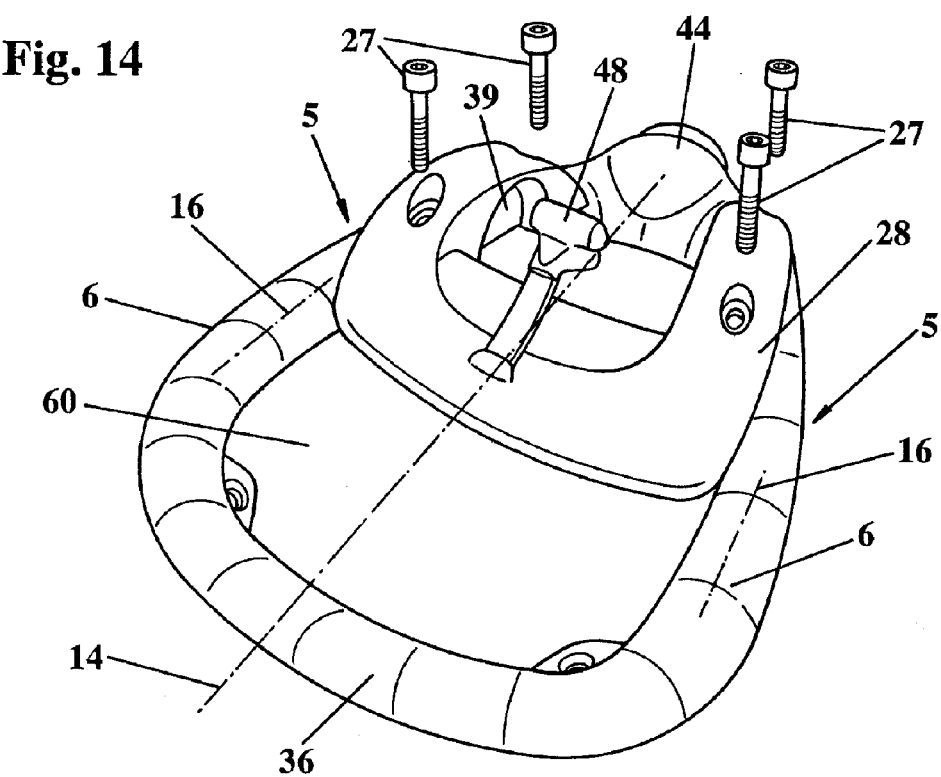
FIG. 14 is a perspective illustration of the support device comprising a lid securing the vacuum pipe.

The embodiment according to FIGS. 13 and 14 has a pivotable attachment of the end of the vacuum pipe 2 with vacuum opening 8 to the support member 11. In the illustrated embodiment, the support member 11 is preferably a unitary part of the blower air channels 5 and of the end pipes 6 that are connected by connecting pipe 36 with one another so as to convey the blower air. The support member 11 has opposed bearing receptacles 19 in which round flanges 29 of the vacuum pipe 2 are rotatably supported. The bearing receptacles 19 determine the axis of rotation 18 of the vacuum pipe 2 in the support member 11 about which the round flanges 29 and the vacuum pipe 2 are rotatable. The axis of rotation 18 is positioned approximately parallel to the plane that is defined by the longitudinal axes 16 of the end pipes 6.

After insertion of the round flanges 29 into the bearing receptacles 19, the arrangement is closed by a bearing lid 28 in which the bearing receptacles 39 are formed. The bearing receptacles 19 and 39 are configured as bearing half shells so that the bearing receptacles are completely closed, respectively, after attachment of the bearing lid 28 and surround the round flanges 29 of the vacuum pipe 2. The bearing lid 28 is secured by fastening screws 27 on the support member 11 for which purpose appropriate screw holes 34 are provided in the support member 11. The bearing lid 28 is provided also with a grip 48 with which the operator can carry out an adjustment of the support member 11 relative to the vacuum pipe 2 after loosening the fastening screws 27. After tightening the fastening screws 27, the vacuum pipe 2 is fixedly secured in the adjusted rotary position on the support member 11.

The unitary or monolithic configuration of the vacuum channels 5, of the end pipes 6, and of the connecting pipe 36 provides the possibility of configuring a blower air socket 44 positioned in the center plane 14 for connecting the blower pipe 4 thereto. The supply of the blower air can thus be realized centrally approximately within the center plane 14. The vacuum pipe 2 and the blower pipe 4 are positioned above one another when viewed in a plan view.

A suction blower can serve as a drive for the vacuum arrangement 1 according to the invention wherein the suction blower can be connected on the suction side to the vacuum pipe 2 and on the blower side to the blower pipe 4. In order to prevent that the material to be collected is sucked in through the suction blower, the suction air flow can also be generated by injecting blower air into the vacuum pipe 2 so that exclusively the blower air flow of a blower is used as a drive.

While specific embodiments of the invention have been shown and described in detail to illustrate the inventive principles, it will be understood that the invention may be embodied otherwise without departing from such principles.

What is claimed is:

1. A vacuum arrangement comprising:
a vacuum pipe having a vacuum opening facing a ground surface and adapted to pick up from the ground surface a material to be collected, wherein said vacuum pipe is adapted to convey the material to be collected into a collecting container connected to said vacuum pipe and wherein said vacuum pipe has a working area located within an area of said vacuum opening;
at least one blower nozzle having a blower air exit, wherein a blower air flow exiting from said blower air exit is directed onto the ground surface into said working area and wherein said blower air exit and said vacuum opening are positioned at a spacing relative to one another;
wherein at least a partial area of said working area between said blower air exit and said vacuum opening is open in an upward direction away from the ground surface.

2. The vacuum arrangement according to claim 1, wherein said partial area of said working area located between said blower air exit and said vacuum opening is visible from above in a direction toward the ground surface.

3. A vacuum arrangement comprising:
a vacuum pipe having a vacuum opening facing a ground surface and adapted to pick up from the around surface a material to be collected, wherein said vacuum pipe is adapted to convey the material to be collected into a collecting container connected to said vacuum pipe and wherein said vacuum pipe has a working area located within an area of said vacuum opening;

at least one blower nozzle having a blower air exit, wherein a blower air flow exiting from said blower air exit is directed onto the around surface into said working area and wherein said blower air exit and said vacuum opening are positioned at a spacing relative to one another;

wherein several of said at least one blower nozzle are provided;

wherein relative to said working area two of said several blower nozzles, respectively, are positioned approximately opposed to one another to form a pair.

4. The vacuum arrangement according to claim 1, further comprising a closure element adapted to close completely or partially said partial area of said working area.

5. The vacuum arrangement according to claim 4, wherein said closure element is a slide.

6. The vacuum arrangement according to claim 4, wherein said closure element is comprised of a transparent material.

7. The vacuum arrangement according to claim 1, wherein said blower air flow is oriented at least partially toward said vacuum opening.

8. The vacuum arrangement according to claim 1, wherein said at least one blower nozzle is arranged opposite said vacuum opening.

9. The vacuum arrangement according to claim 1, wherein said vacuum opening has an entry plane and wherein said entry plane is positioned relative to the ground surface at an angle of less than approximately 70 degrees.

10. The vacuum arrangement according to claim 9, wherein said angle is approximately 45 degrees.

11. The vacuum arrangement according to claim 1, wherein several of said at least one blower nozzle are provided.

12. The vacuum arrangement according to claim 1, further comprising a support member, wherein said vacuum pipe and said at least one blower nozzle are secured on said support member and wherein said support member comprises a spacer adapted to be placed onto the ground surface.

13. The vacuum arrangement according to claim 12, wherein said spacer is a gliding means.

14. The vacuum arrangement according to claim 13, wherein said gliding means is at least one runner.

15. The vacuum arrangement according to claim 12, wherein said spacer is a roller having an axis of rotation extending approximately parallel to the ground surface.

16. The vacuum arrangement according to claim 15, wherein said axis of rotation extends approximately parallel to said vacuum pipe when viewed in a plan view of said vacuum arrangement.

17. The vacuum arrangement according to claim 16, wherein said roller is crowned in a direction of said axis of rotation.

18. The vacuum arrangement according to claim 12, wherein said spacer is made of a flexible material.

19. The vacuum arrangement according to claim 18, wherein said spacer is comprised of flaps.

20. The vacuum arrangement according to claim 1, wherein a blower air volume exiting from said at least one blower nozzle is distributed uniformly onto both sides of said working area relative to a center plane of said working area.

21. The vacuum arrangement according to claim 1, wherein an angle between said vacuum pipe and an assembly supporting said at least one blower nozzle is adjustable.

22. The vacuum arrangement according to claim 3, wherein at least a partial area of said working area between said blower air exit and said vacuum opening is open in an upward direction away from the ground surface.

23. The vacuum arrangement according to claim 3, wherein said blower air flows of said pairs are oriented at identical angles toward the ground surface, respectively.

24. The vacuum arrangement according to claim 3, wherein said several blower nozzles are positioned at different angles relative to the ground surface.

25. The vacuum arrangement according to claim 3, further comprising a ring on which said several blower nozzles are arranged, wherein said ring is arranged relative to said vacuum opening such that said vacuum opening is centrally located within said ring.

26. The vacuum arrangement according to claim 25, wherein said ring is adapted to guide blower air.

27. The vacuum arrangement according to claim 25, wherein all of said several blower nozzles of said ring are positioned at identical angles relative to the ground surface.

28. The vacuum arrangement according to claim 3, wherein said blower air flows of said pairs cross one another.

29. The vacuum arrangement according to claim 28, wherein said blower air flows cross one another approximately at a center plane of said working area or near a center of said vacuum opening.

* * * * *